25977

Dec. 4, 1962 J. B. ROSSO 3,067,364

CAPACITANCE RESPONSIVE RELAY CIRCUIT

Filed Nov. 18, 1959

2 Sheets-Sheet 1

INVENTOR.
JOHN B. ROSSO

BY Arthur L Wade

ATTORNEY

CAPACITANCE RESPONSIVE RELAY CIRCUIT

INVENTOR.
JOHN B. ROSSO
BY Arthur L. Wade
ATTORNEY

United States Patent Office 3,067,364
Patented Dec. 4, 1962

3,067,364

CAPACITANCE RESPONSIVE RELAY CIRCUIT

John B. Rosso, Tulsa, Okla., assignor to Instruments, Inc., Tulsa, Okla., a corporation of Oklahoma Filed Nov. 18, 1959, Ser. No. 853,845
2 Claims. (Cl. 317—148.5)

The present invention relates to transistorized capacitance responsive relay circuits.

Electronic circuits, employing vacuum tubes, have been used to control simple solenoid relays in response to capacitance values of primary element probes. The vacuum tube circuits have numerous limitations.

Traditionally, electronic circuits are inherently limited to the vulnerability of the vacuum tubes they employ. Vacuum tubes are readily damaged from a physical standpoint and have a limited useful life which had discouraged their use in many heavy industrial systems, particularly those employing control. Admittedly, vacuum tubes have been continually improved. Nevertheless, vacuum tubes are not generally available which are the rugged equivalent of the so-called solid state electric components.

Also, vacuum tube circuits generally require a level of power that makes portability difficult. The complex, large, power supply required is often the major problem in making an instrument portable. Further, the higher the power requirements of an electric circuit the more dangerous it is in applications where an explosive atmosphere, or inflammable liquids, exist.

Aside from the generalized problems of vacuum tube circuits, those of the circuits responsive to variable capacitance values have not had satisfactory sensitivity. Too often, the amount of the change in dielectric constant at the locus of the primary element has not been able to generate the power required to actuate simple relays quickly and positively. Additionally, the setpoint of relay operability in the present vacuum tube circuits has not been simple and within the skill of many field personnel using these instruments.

Finally, in oscillator circuits using vacuum tubes the current drawn is at its minimum. The relay circuits responsive to the vacuum tube oscillator circuit are actuated when the oscillation is killed. The transistorized circuit, however, is normally arranged to draw current during oscillation. Therefore, the fail-safe feature is most easily obtained by use of transistors.

The principal object of the present invention is to provide a capacitance responsive circuit which is physically rugged, readily portable, of low power requirement and inherently fail-safe.

Another object is to provide a capacitance responsive circuit with an improved sensitivity to dielectric constant change at the locus of detection.

Another object is to provide a simple manual adjustment with which to establish the setpoint of a relay circuit reaction to a capacity responsive transistorized circuit.

The present invention is embodied in a circuit using electrical signal amplifying means in the form of transistors. A primary element of the circuit is provided in the form of a capacitance probe, responding to dielectric constant change in modifying the A.-C. voltage output of a transistorized oscillator circuit.

The invention further contemplates the capacitance-controlled oscillator circuit having a single, manually adjustable, capacitance with which the circuit is adjusted to produce an output signal which will actuate a relay circuit in response to a predetermined value of dielectric constant.

The invention further contemplates a circuit having the arrangement which will give flexibility of simplicity in enabling a minimum component change to be made in characterizing the circuit from fail-safe to non-fail-safe.

Other objects, advantages and features of this invention will become apparent to one skilled in the art upon consideration of the written specification, appended claims, and attached drawings wherein:

Figure 1:
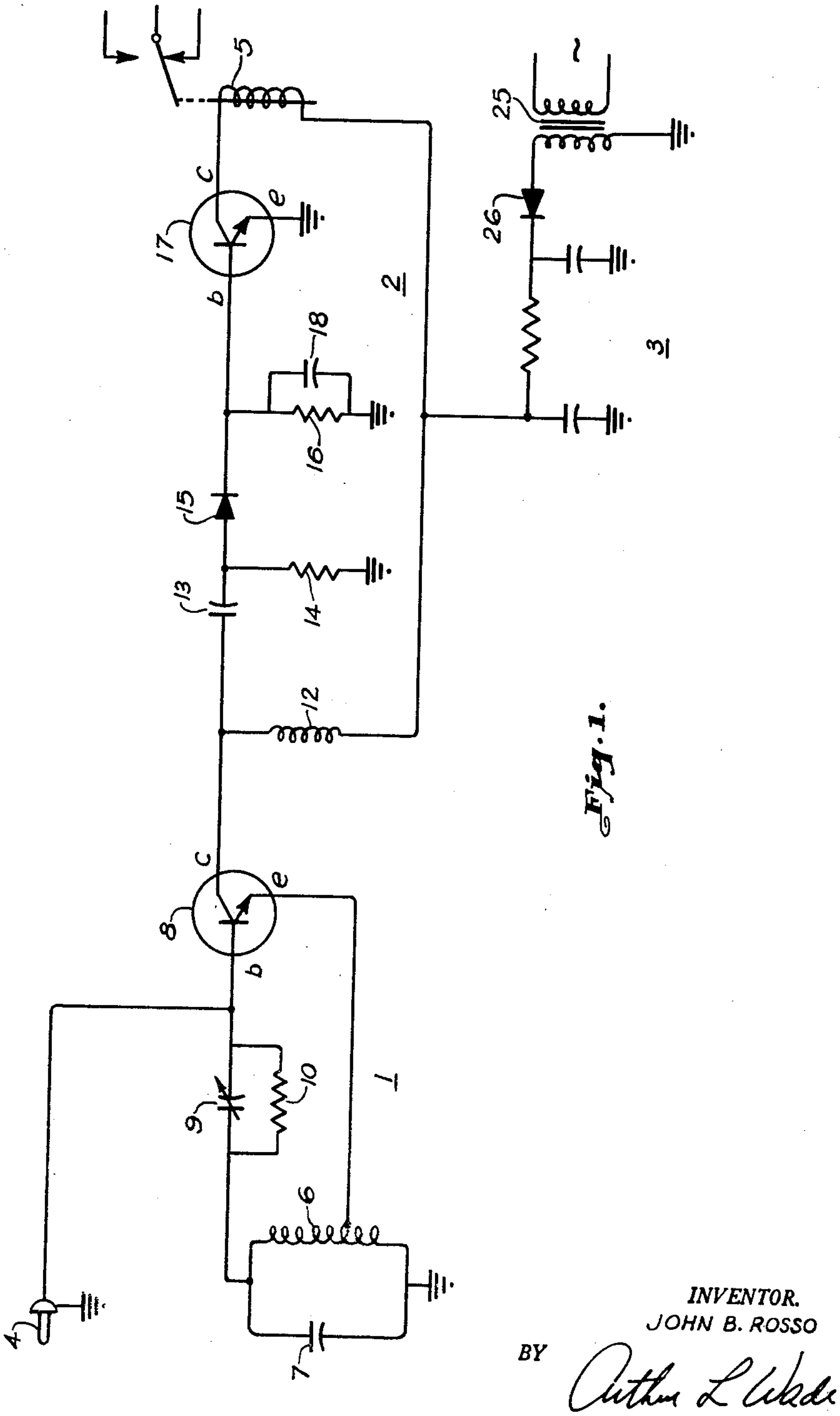
FIG. 1 is a schematic illustration of a circuit embodying the present invention.

Referring specifically to FIG. 1, the complete circuit embodying the present invention is schematically illustrated. The circuit will be considered in three parts. The detector circuit will be considered as the first part, being illustrated as having a primary element responding directly to dielectric constant changes. Detector circuit 1 applies the output it develops to relay circuit 2. The power supply 3 is provided to apply a D.-C. voltage to both detector circuit 1 and relay circuit 2.

Probe 4 is the primary element of the detector circuit 1 in that it senses the changes directly in dielectric constant at a locus. Relay 5 is the ultimate controller element of the system. Changes in dielectric constant at the locus operate the relay whose switch actuates subsequent circuits in any of the many ways that may be desired.

*Detector Circuit 1*

Detector circuit 1 is so termed because it is the portion of the complete system disclosed which incorporates the probe 4 as a primary element directly responsive to the dielectric constant at a locus. In a broad sense, detector circuit 1 is an oscillator, controlled by the primary element to develop an output A.-C. voltage which energizes the relay circuit 2 to hold relay 5 in a predetermined position.

As an oscillator circuit, detector circuit 1 comprises an inductance 6 and capacitance 7 in parallel, connected to a transistor 8 and adjustable R-C network consisting of adjustable capacitor 9 and resistance 10 in parallel. Probe 4 is connected between the R-C network and transistor 8 as a shunt to ground.

The D.-C. voltage of power supply 3 is applied across a portion of inductance 6, as characteristic of the so-called "Hartley Oscillator" arrangement. With the supply 3 applied to inductance 6 through the collector-emitter circuit of transistor 8, the feed back current on which oscillation depends is controlled by the shunt to ground represented by the probe 4.

When the detector circuit 1 oscillates, the A.-C. voltage developed on the base of transistor 8 is amplified on the collector of this transistor 8. The value to which capacitor 9 is adjusted sets the level of A.-C. voltage amplified by transistor 8. Resistance 10 is given a value to predetermine the D.-C. voltage value setting the operating point of the transistor.

This arrangement for detector circuit 1 provides the basis for an oscillator-relay circuit which is inherently fail-safe. By the use of a transistor in this circuit, the maximum current is drawn through the collector-emitter section during oscillation, i.e. when the dielectric constant at the locus is not at the set point, or operating point. Therefore, when the set point value of the probe is reached, the A.-C. voltage generated in the oscillator is shunted to ground and there is no output A.-C. voltage to the relay circuit controlled. With no A.-C. voltage output, the relay is de-energized. It is then apparent this arrangement provides that power or circuit failure also de-energizes the relay circuit, making the system fail-safe.

*Relay Circuit 2*

The A.-C. voltage output of detector circuit 1, appearing on the collector of transistor 8, is developed across inductance 12 as a load. The D.-C. voltage of source 3 is blocked from the relay circuit by coupling capacitor 13. The A.-C. voltage output of detector circuit 1 is passed by capacitor 13 and is developed across resistance 14.

The A.-C. voltage which appears across resistance 14 is the signal with which relay 5 is controlled. The A.-C. voltage is first rectified, then filtered and then applied to the base of the transistor. The D.-C. voltage on the base of the transistor causes development of a large emitter-to-collector current flow from the source 3. Relay 5 is in the emitter-to-collector circuit and is, thereby, held in one position by the current flowing therein.

Specifically, the A.-C. voltage across resistance 14 is first rectified by diode 15. The rectified voltage appears across resistance 16 and is filtered by capacitance 18. The polarity of the voltage across resistance 16 is arranged such that the base of transistor 17 is positive with respect to its emitter. A small emitter-to-base current flow is developed and a large emitter-to-collector current flow results. The relay 5 is energized by the emitter-to-collector current and held in one predetermined position.

When the capacity of probe 4 increases, its reactance decreases, the A.-C. voltage in the oscillator circuit is shunted to ground. The A.-C. voltage at the base of transistor 8 decreases to substantially zero and, of course, results in no voltage being developed on the base of transistor 17. Without current flow in the emitter-to-collector circuit of transistor 17, relay 5 is de-energized and its switch, to which it is mechanically linked, is thrown to its alternate position.

The sensitivity of this circuit to changes in dielectric constant is definitely more than the sensitivity of circuits employing vacuum tubes. The oscillation of detector circuit 1 goes from an operative condition to a non-operative condition over a range of dielectric constant variation to which the electronic circuits of the prior art do not respond. Further, the adjustment of this circuit to these sharply-defined set points is obtained with a new degree of simplicity. It is only necessary to manually adjust the value of the capacitance 9 in detector 1 to set the response point.

*Power Supply 3*

The power supply is a half-wave rectifier. Transformer 25 has its primary windings supplied from a source of A.-C. voltage. The voltage which then appears across the secondary winding of transformer 25 is rectified by diode 26. The rectified voltage is then filtered by a resistance-capacitance network and applied simultaneously to the collector-to-emitter circuits of transistors 18 and 17.

It is to be specifically understood that power supply 3 could be a simple battery. The current drain on this source is in the order of a few milliamperes. The level of current drain is so low that it is possible to use a battery of suitable voltage for a period comparable to its shelf life. When power requirements of this magnitude are all that is demanded, the circuit can be used in proximity to dangerous atmospheres and inflammable liquids without danger. Further, this level of power makes the system readily portable.

*Non-Fail-Safe Function*

Figure 2:
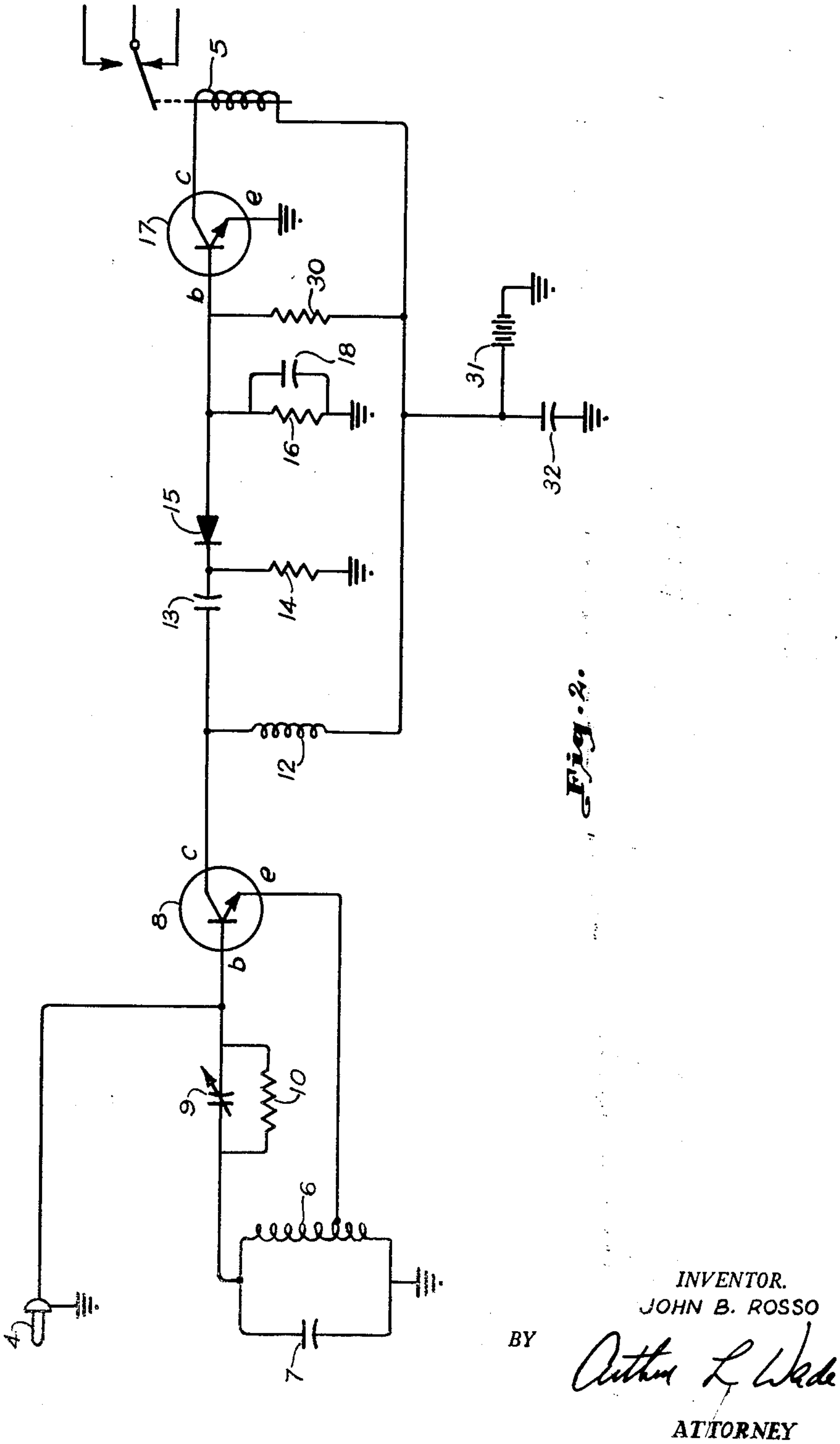
FIG. 2 is a variation of the circuit of FIG. 1 in which the circuit is non-fail-safe.

FIG. 2 is presented to demonstrate how readily the novel arrangement can be converted to have a non-fail-safe characteristic. To convert the fail-safe arrangement of the circuit of FIG. 1 to the non-fail-safe arrangement of FIG. 2 it is only necessary to reverse the polarity of diode 15 in this novel circuit and add a simple resistance element 30 between the base of the relay transistor and the power supply. The positive voltage applied to the base of transistor 17 would cause the transistor to energize the relay. However, with the polarity of diode 15 now reversed, the positive voltage of resistor 30 is bucked as long as detector circuit 1 oscillates.

When the dielectric constant to which probe 4 is responsive reaches its predetermined set point value, the oscillations are killed, and the bucking voltage it generates no longer opposes the positive voltage applied to the base of transistor 17 through resistance 30. Relay 5 is then energized by the current flow in the emitter-to-collector circuit of transistor 17 as in FIG. 1. Another way to analyze the relation between the detector circuit, and relay circuit 2 is to state that the relay 5 is energized when the output signal of detector circuit 1 is lost.

Finally, it is to be noted that the power supply for the circuit of FIG. 2 is a battery 31. A stabilizing capacitor 32 is shown in a position to shunt spurious A.-C. voltages to ground. Thus, the relay circuit is protected from going into an undesirable oscillation during normal operation.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A circuit with which an A.-C. voltage is developed including;
 an oscillator section including,
 a first transistor having a base and an emitter and a collector,
 a source of D.-C. voltage connected to the collector,
 a capacitance element and an inductance coil connected to each other in parallel,
 a manually adjustable capacitance and fixed resistance connected to each other in parallel and as a unit between the capacitance-inductance unit and transistor base,
 and a connection from a tap on the inductance coil to the emitter,
 a detector capacitance element connected to the first transistor base as an A.-C. shunt to ground,
 a second transistor having a base and a collector and an emitter;
 a connection including a rectifier and filter for D.-C. voltage is extended between the base of the second transistor and the collector of the first transistor;
 and the solenoid coil of a relay is connected to the collector of the second transistor and the D.-C. voltage source,
 whereby the A.-C. voltage of the oscillator section is rectified and filtered into a positive D.-C. voltage for the base of the second transistor to control the D.-C. current flowing in the solenoid coil and collector-emitter circuit of the second transistor and the solenoid coil is therefore energized until a predetermined capacitance of the detector decays the A.-C. voltage of the collector of the first transistor.

2. A circuit with which an A.-C. voltage is developed including;
 an oscillator section including,
 a first transistor having a base and an emitter and a collector,
 a source of D.-C. voltage connected to the collector,
 a capacitance element and an inductance coil connected to each other in parallel,
 a manually adjustable capacitance and fixed resistance connected to each other in parallel and as a unit between the capacitance-inductance unit and transistor base, and a connection from a tap on the inductance coil to the emitter, a detector capacitance element connected to the first transistor base as an A.-C. shunt to ground, a second transistor having a base and a collector and an emitter;

a connection including a rectifier is extended between the base of the second transistor and the collector of the first transistor;

and the solenoid coil of a relay is connected to the collector of the second transistor and the D.-C. voltage source, whereby the A.-C. voltage of the oscillator section is rectified into a negative D.-C. voltage for the base of the second transistor;

a resistor is connected from the source of D.-C. voltage to the base of the second transistor, whereby the positive voltage of the D.-C. source and the negative voltage of the rectified A.-C. voltage output of the oscillator oppose each other on the base of the second transistor and the solenoid coil of the relay remains de-energized except during the period the detector capacitance causes the A.-C. voltage of the oscillator output to assume its minimum value.

References Cited in the file of this patent

UNITED STATES PATENTS

| | | |
|---|---|---|
| 2,889,496 | Moore | June 2, 1959 |
| 2,916,703 | Stidger | Dec. 8, 1959 |

OTHER REFERENCES

Scott: "Sensitive Capacity Relay," Radio Electronics, June 1953, pages 58, 63 and 64.